(12) United States Patent
Liberman et al.

(10) Patent No.: US 10,388,171 B2
(45) Date of Patent: Aug. 20, 2019

(54) COCKPIT DISPLAY SYSTEMS AND METHODS FOR GENERATING COCKPIT DISPLAYS INCLUDING DIRECT APPROACH ENERGY MANAGEMENT SYMBOLOGY

(71) Applicant: HONEYWELL INTERNATIONAL INC., Morris Plains, NJ (US)

(72) Inventors: Aric Charles Liberman, Yuma, AZ (US); Barbara Holder, Seattle, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 191 days.

(21) Appl. No.: 15/433,272

(22) Filed: Feb. 15, 2017

(65) Prior Publication Data

US 2018/0233056 A1   Aug. 16, 2018

(51) Int. Cl.
| | |
|---|---|
| *G01C 23/00* | (2006.01) |
| *B64D 43/00* | (2006.01) |
| *G08G 5/02* | (2006.01) |
| *B64D 45/08* | (2006.01) |
| *G09G 5/36* | (2006.01) |

(Continued)

(52) U.S. Cl.
CPC ............. *G08G 5/025* (2013.01); *B64D 45/04* (2013.01); *B64D 45/08* (2013.01); *G01C 23/00* (2013.01); *G08G 5/0021* (2013.01); *G09G 5/363* (2013.01); *G09G 5/38* (2013.01); *G09G 2340/0464* (2013.01); *G09G 2380/12* (2013.01)

(58) Field of Classification Search
CPC ..................................................... G08G 5/025
See application file for complete search history.

(56) References Cited

U.S. PATENT DOCUMENTS 8,774,989 B1   7/2014   Bush et al.
9,499,279 B2   11/2016  He et al.
(Continued)

FOREIGN PATENT DOCUMENTS

EP   2993657 A1   3/2016
EP   3296698 A2   3/2018

OTHER PUBLICATIONS

Extended European Search Report for Application No. 18156825.4 dated Jul. 16, 2018.

(Continued)

*Primary Examiner* — Joseph H Feild
*Assistant Examiner* — Pameshanand Mahase
(74) *Attorney, Agent, or Firm* — Lorenz & Kopf, LLP

(57) ABSTRACT

Cockpit display systems and methods are provided for generating energy management symbology on cockpit displays, which aid pilot decision-making when evaluating and executing direct approaches. In an embodiment, the cockpit display system includes a cockpit display device on which a first cockpit display, such as a vertical situation display or a horizontal navigation display, is generated. A controller is operably coupled to the cockpit display device and configured to: (i) identify a direct approach (DA) path to a configuration point located over a destination airfield; (ii) calculate a first DA energy estimate for the aircraft to fly the DA path under engine idle conditions and arrive at the configuration point with an airspeed less than a configuration airspeed; and (iii) generate symbology on the first cockpit display indicative of the first DA energy estimate.

16 Claims, 7 Drawing Sheets

(51) Int. Cl.
  *G09G 5/38* (2006.01)
  *B64D 45/04* (2006.01)
  *G08G 5/00* (2006.01)

(56) References Cited

U.S. PATENT DOCUMENTS

| | | | |
|---|---|---|---|
| 2008/0249674 A1 | 10/2008 | Constans | |
| 2016/0063867 A1* | 3/2016 | Zammit | G08G 5/0039 701/18 |
| 2016/0090193 A1* | 3/2016 | He | B64D 45/04 340/971 |
| 2016/0163201 A1* | 6/2016 | Le Merrer | G08G 5/003 701/4 |
| 2016/0229554 A1* | 8/2016 | Kawalkar | G01C 23/005 |
| 2017/0229024 A1* | 8/2017 | Moravek | G08G 5/0039 |

OTHER PUBLICATIONS

Catton, Lewis, et al. "Designing Energy Display Formats for Civil Aircraft: Reply to Amelink, Mulder, van Paassen and Flach," The International Journal of Aviation Psychology, vol. 17, No. 1, Jan. 2007, XP008133052, pp. 31-40.

Shish, K. et al.; Trajectory Prediction and Alerting for Aircraft Mode and Energy State Awareness; NASA Ames Research Center and German Aerospace Center DLR; American Institute of Aeronautics and Astronautics.

\* cited by examiner

COCKPIT DISPLAY SYSTEMS AND METHODS FOR GENERATING COCKPIT DISPLAYS INCLUDING DIRECT APPROACH ENERGY MANAGEMENT SYMBOLOGY

TECHNICAL FIELD

The following disclosure relates generally to cockpit display systems and, more particularly, to cockpit display systems and methods for generating energy management symbology on cockpit displays, which aid pilot decision-making in evaluating and executing direct approaches.

BACKGROUND

An aircraft (A/C) in motion is usefully described in terms of energy content. The energy content of an airborne A/C is primarily determined by the altitude of the A/C, the airspeed at which the A/C is traveling, and gross A/C weight. Generally stated, a pilot can selectively increase the energy content of an A/C through gains in airspeed or altitude achieved by applying additional thrust. Conversely, a pilot can bring about a controlled decrease in A/C energy content over time by hastening the rate at which the A/C energy content dissipates. This may be accomplished by increasing the drag coefficient of the A/C by, for example, altering the angle of attack of the A/C or by deploying one or more drag devices, such as flaps, slats, and airbrakes. Other factors, which may reside outside of a pilot's control, can also influence the energy content of an A/C, such as shifts in wind speed and direction.

Proper management of A/C energy content is particularly vital during approach and landing. When approaching an airport or other airfield for landing, a fixed wing A/C ideally arrives at a predetermined distance ahead of its destination runway at an airspeed affording the aircrew sufficient opportunity to configure the A/C for landing (hereafter, the "configuration distance"). If the A/C reaches the configuration distance in an under-energy state (that is, with an excessively low airspeed or Height Above Threshold (HAT)), additional thrust may be required to return the A/C to the acceptable energy state for landing. The application of such thrust, which is otherwise unneeded, results in decreased fuel efficiency, increased noise and chemical emissions, exacerbated component wear, higher operational costs, and other such undesired effects. Conversely, if an A/C reaches the configuration distance in an over-energy state (that is, with an excessive airspeed or HAT), the aircrew may be forced to abort the current landing attempt and initiate go-around. If, instead, touching down on the runway in an over-energy state, the A/C may be unable to adequately dissipate the remainder of its energy content during rollout and a runway excursion may occur. Both of these situations add undesired cost and delay to aircraft operation and can potentially contribute to air traffic congestion, detract from passenger comfort, and have other negative consequences.

Although the situations above are desirably avoided, pilot mismanagement of A/C energy content during approach and landing continues to occur for multiple reasons. First, it should be recognized that approach and landing are amongst the most dynamic and demanding phases of flight. Second, at any juncture after assigning a multi-leg approach route to a particular A/C, Air Traffic Control (ATC) may clear the A/C to depart from the assigned route and instead proceed directly to the runway. In this instance, a pilot is suddenly tasked with ascertaining whether departure from the assigned multi-leg approach route will bring the A/C to the configuration distance in an acceptable energy state. Depending upon various factors, this can be difficult for a pilot to accurately ascertain even when presented with an ideal vertical descent profile, as calculated by a Flight Management System (FMS) and graphically represented on a Vertical Situation Display (VSD). If unsure as to the ramifications of accepting the ATC-proposed direct approach, a pilot may simply decline the direct approach option. This potentially results in a lost opportunity for improved operational efficiency for the aircraft and increased traffic throughput for the airfield. Alternatively, the pilot may accept the ATC-proposed direct approach. In so doing, however, a pilot risks mentally miscalculating the energy requirements of the direct approach relative to the current energy content of the A/C and/or otherwise risks mismanagement of the energy content of the A/C when carrying-out the direct approach.

BRIEF SUMMARY

Cockpit display systems are provided for generating energy management symbology on cockpit displays, which aid pilot decision-making when evaluating and executing direct approaches. In an embodiment, the cockpit display system includes a cockpit display device on which a first cockpit display, such as a vertical situation display or a horizontal navigation display, is generated. A controller is operably coupled to the cockpit display device and configured to: (i) identify a direct approach (DA) path to a configuration point located over a destination airfield; (ii) calculate a first DA energy estimate for the aircraft to fly the DA path under engine idle conditions and arrive at the configuration point with an airspeed less than a configuration airspeed; and (iii) generate symbology on the first cockpit display indicative of the first DA energy estimate. In certain implementations, the steps of identifying, calculating, and generating may be repeatedly performed, while the aircraft flies a multi-leg approach route terminating at the destination airfield.

In another embodiment, the cockpit display system includes a cockpit display device on which a horizontal navigation display is generated. A controller is operably coupled to the cockpit display device and is configured to: (i) identify a direct approach (DA) path to a configuration point over a destination airfield, the configuration point located along a configuration ring centered about a touchdown reference point; and (ii) generate the horizontal navigation display to include a configuration ring graphic representative of the configuration ring, an aircraft icon representative of a horizontal position of the aircraft, and a DA path graphic representative of the DA path and extending from the aircraft icon to the configuration ring. In certain implementations, the controller may be further configured to generate a Vertical Situation Display (VSD) including symbology indicative of a DA energy estimate for the aircraft to fly the DA path under engine idle conditions and arrive at the configuration point with an airspeed less than a configuration airspeed.

Further disclosed are embodiments of a method for generating energy management symbology on cockpit displays, which aid pilot decision-making when evaluating and executing direct approaches. In one embodiment, the method includes the step or process of identifying a direct approach (DA) path to a configuration point located over a destination airfield. A first DA energy estimate is calculated for the aircraft to fly the DA path under engine idle conditions and arrive at the configuration point with an airspeed less than a configuration airspeed. Symbology is then generated on a first cockpit display indicative of the first DA energy estimate. In implementations wherein cockpit display is a Vertical Situation Display (VSD) including an aircraft icon, the method may further include the step or process of varying a vertical position of the symbology on the VSD relative to the aircraft icon as the first DA energy estimate varies with respect to a current energy content of the aircraft.

BRIEF DESCRIPTION OF THE DRAWING/S

At least one example of the present disclosure will hereinafter be described in conjunction with the following figures, wherein like numerals denote like elements, and:

FIG. 1 is a block diagram of a cockpit display system onboard an aircraft (A/C) and suitable for generating one or more cockpit displays including Direct Approach Energy Management (DAEM) symbology, as illustrated in accordance with an exemplary embodiment of the present disclosure;

FIGS. 2 and 3 are screenshots of an exemplary Horizontal Navigation (HNAV) display and a Vertical Situation Display (VSD), respectively, which may be generated by the cockpit display system in FIG. 1 in a first exemplary flight scenario in which the A/C is projected to arrive in an under-energy state if proceeding directly to a default configuration point over an airfield under engine idle conditions;

Figure 10:
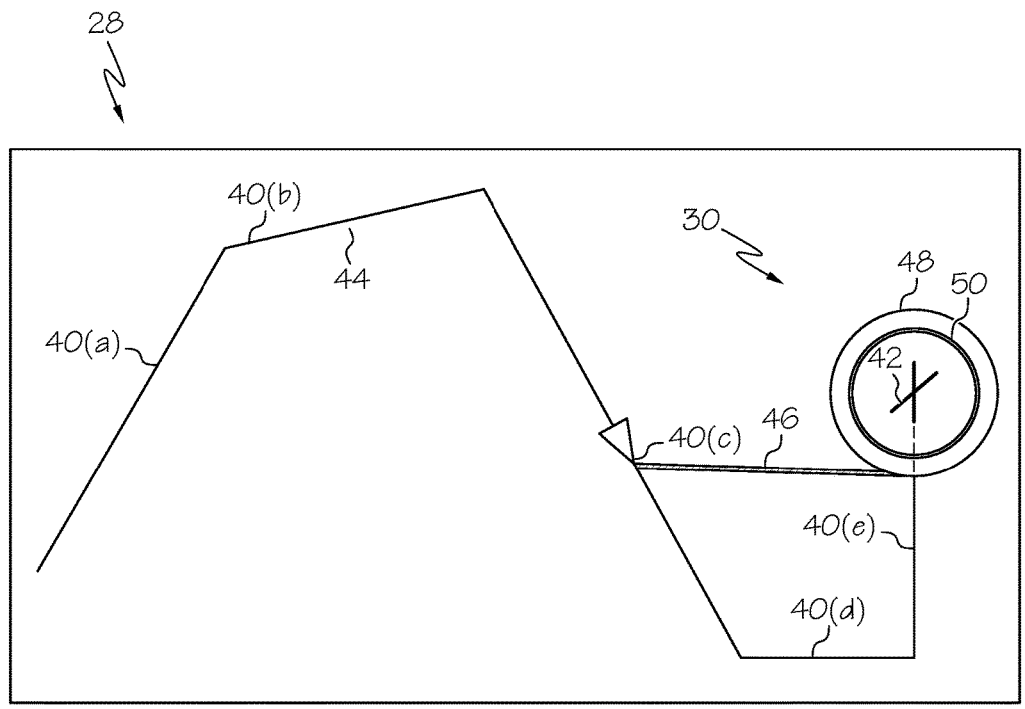
Figure 11:
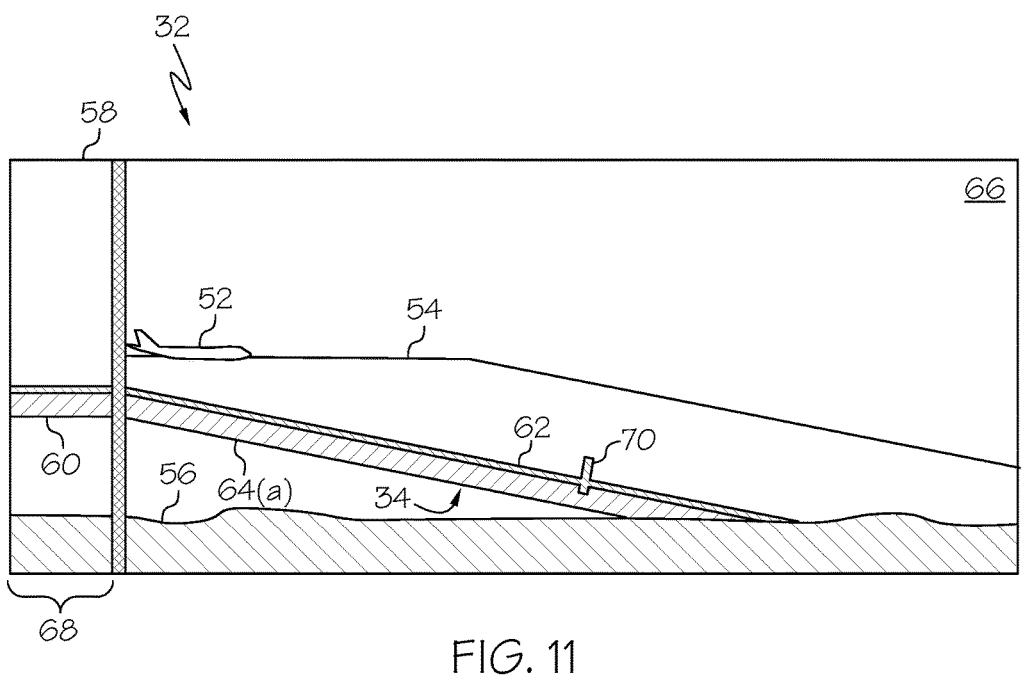
Figure 12:
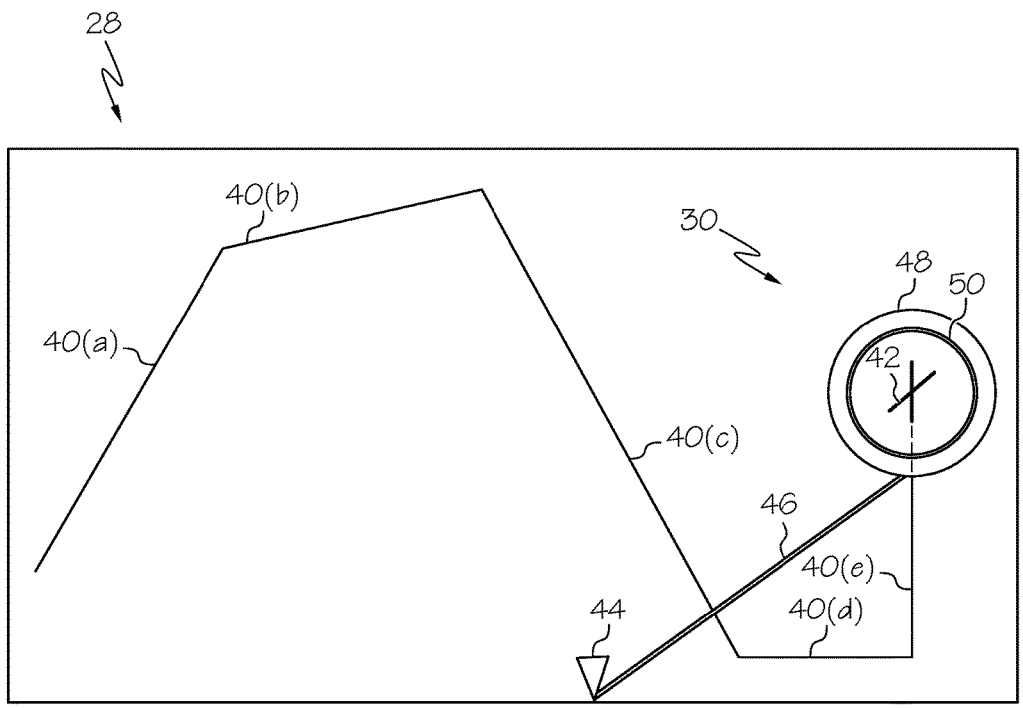
Figure 13:
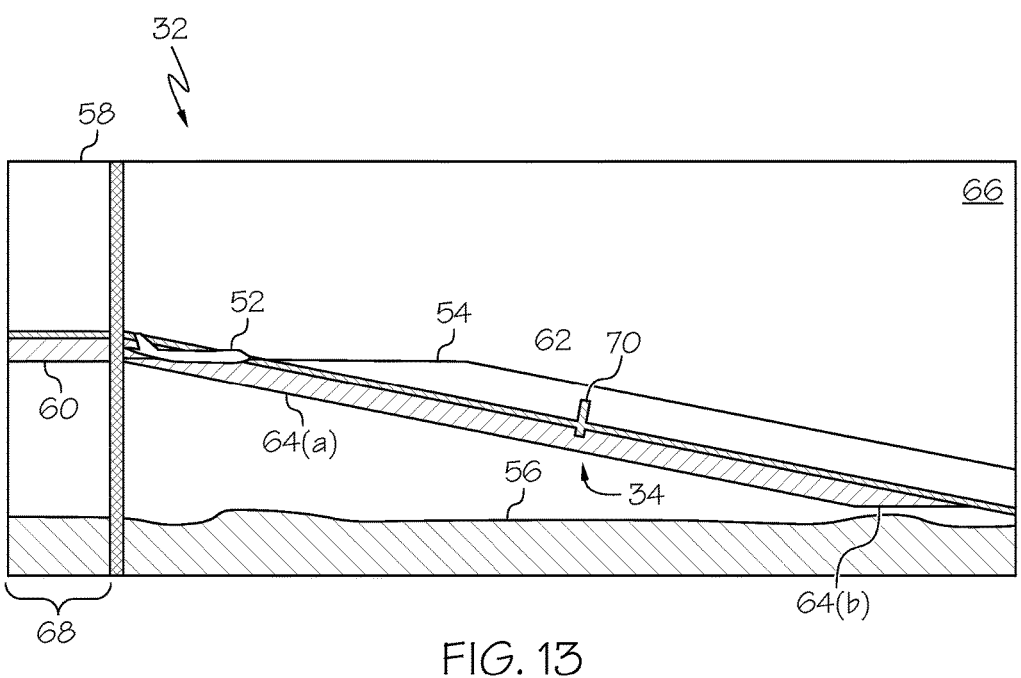

FIGS. 10 and 11 are screenshots of the HNAV display and VSD, respectively, as shown in a fifth exemplary flight scenario in which the A/C is again projected to arrive in an over-energy state if proceeding directly to the runway-specific configuration point; and FIGS. 12 and 13 are screenshots of the HNAV display and VSD, respectively, as shown in a sixth exemplary flight scenario in which the A/C has deviated from the multi-leg approach route and is now projected to arrive in an acceptable energy state if proceeding directly to the runway-specific configuration point.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As appearing herein, the term "ownship aircraft" or "ownship A/C" refers to an aircraft equipped with the below-described cockpit display system. As further appearing herein, the term "managed energy direct approach" refers to a direct approach during which the ownship A/C arrives at a predetermined (ground) distance ahead of a touchdown reference point (e.g., the touchdown zone of a runway, if known to the display system) within a desired airspeed range and a desired altitude range under engine idle conditions; that is, without requiring the application additional thrust or requiring only a minimal amount of additional thrust by the propulsive engine or engines of the ownship A/C. In implementations, the predetermined ground distance and airspeed may be selected to provide the aircrew with an adequate time period to configure the ownship A/C for landing and, thus, may be referred to herein as a "configuration distance" and a "configuration airspeed," respectively. The desired altitude range may be expressed in terms of the vertical height of the ownship A/C above the threshold of a destination runway (or another landing surface if the destination runway is unknown to the cockpit display system) and, specifically, in terms of "Height Above Threshold" or "HAT."

The following describes embodiments of a cockpit display system and method for generating Direct Approach Energy Management (DAEM) symbology on cockpit displays, which aid pilot decision-making in evaluating and executing direct approaches. Generally, the DAEM symbology visually conveys disparities between the current energy content of the ownship A/C and the estimated energy required to execute a managed energy direct approach. The DAEM symbology can be presented on any number and type of cockpit displays, but is usefully presented on a Vertical Situation Display (VSD) in conjunction with an VSD A/C icon and a computed vertical descent profile. The DAEM symbology may include one or more Direct Approach Energy Estimate (DAEE) graphics, the vertical positioning of which is varied with respect to the VSD A/C icon to reflect changes in the relationship between the current A/C energy content and the estimated energy required to execute a managed energy direct approach. The DAEE graphics can include, for example, an indicator graphic or marker visually conveying a calculated instantaneous energy value or value range required to execute a managed energy direct approach at a present juncture in time. In addition to or in lieu of such an instantaneous energy estimate indicator, the DAEE graphics may include a vertical energy profile or profile range, which visually indicates the projected energy content of the ownship A/C if flying the direct approach in accordance with one or more energy dissipation schemes. The DAEM symbology may still further include graphics indicative of the anticipated timing or sequence of auxiliary drag device (e.g., airbrake) deployment in accordance with the energy dissipation scheme or schemes.

Embodiments of the cockpit display system may also generate DAEM symbology on other graphical cockpit displays in addition to or in lieu of a VSD. For example, in certain implementations, the cockpit display system may generate DAEM symbology on a VSD, while concurrently generating complementary DAEM symbology on a Horizontal Navigation display (referred to herein as an "HNAV" display and generally synonymous with a two dimensional moving map display). In such embodiments, the cockpit display system may generate a direct approach path graphic on the HNAV display and/or graphics indicative of the horizontal location (latitude and longitude) of the touchdown reference point, such as a configuration ring centered about the touchdown reference point, the latter of which may or may not be graphically represented on the HNAV display. By generating a VSD, an HNAV display, and/or another cockpit display to include such DAEM symbology, embodiments of the cockpit display system provide an intuitive and useful visual aid increasing pilot awareness of the likelihood of successfully executing a managed energy direct approach at a given moment in time. Such knowledge may be particularly beneficial when the ownship A/C is progressing along a multi-leg approach route terminating at a destination runway, Air Traffic Control (ATC) issues clearance for a direct approach (e.g., in response to pilot indication that the destination runway has come into sight), and the pilot is suddenly tasked with evaluating and potentially executing a direct approach. An exemplary embodiment of a cockpit display system suitable for generating one or more cockpit displays including DAEM symbology will now be described in conjunction with FIG. 1.

Figure 1:
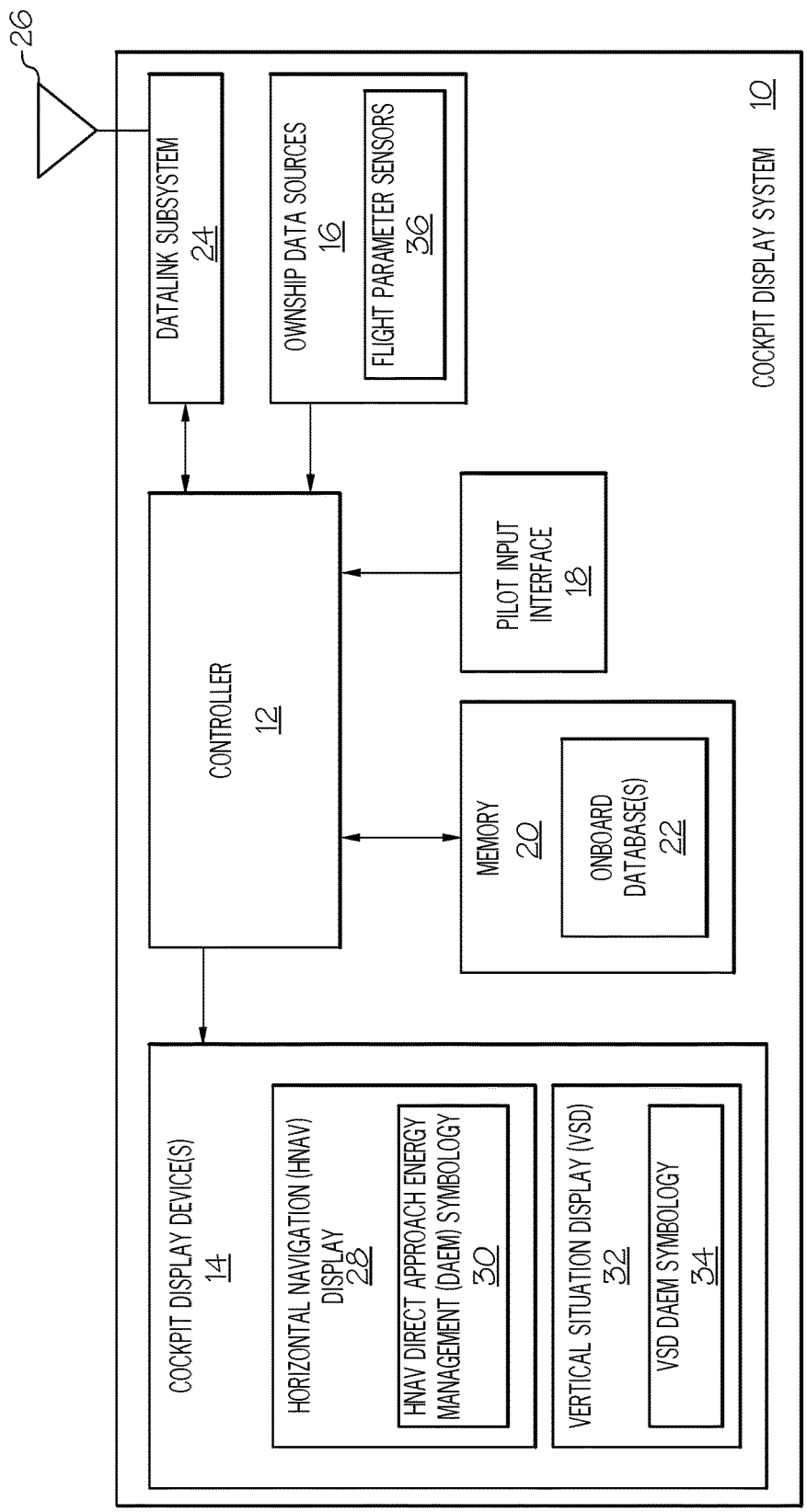

FIG. 1 sets-forth a block diagram of a cockpit display system 10, which is illustrated in accordance with an exemplary and non-limiting embodiment of the present disclosure. As schematically illustrated in FIG. 1, cockpit display system 10 includes the following components or subsystems, each of which may be comprised of one device or multiple interconnected devices: (i) a controller 12, (ii) one or more cockpit display devices 14, (iii) ownship data sources 16, (iv) a pilot input interface 18, (v) a memory 20 containing any number of onboard databases 22, and (vi) a datalink subsystem 24 including an antenna 26. Controller 12 includes at least first, second, third, and fourth inputs, which are operatively coupled to ownship data sources 16, to pilot input interface 18, to memory 20, and to datalink subsystem 24, respectively. Additionally, controller 12 includes at least first, second, and third outputs, which are operatively coupled to cockpit display devices 14, to memory 20, and to datalink subsystem 24, respectively. In further embodiments, cockpit display system 10 may include a greater or lesser number of components, which may be interconnected in various different manners and utilizing any combination of wireless or wired (e.g., avionic bus) connections. Although cockpit display system 10 is schematically illustrated in FIG. 1 as a single unit, the individual elements and components of cockpit display system 10 can be implemented in a distributed manner using any number of physically-distinct and operatively-interconnected pieces of hardware or equipment.

Cockpit display devices 14 may include any number of image-generating devices, which each feature a display screen on which one or more graphical displays can be produced. Cockpit display devices 14 will often be affixed to the static structure of the A/C cockpit, whether as Head Up Display (HUD) devices, Head Down Display (HDD) devices, or a combination thereof. Alternatively, one or more of cockpit display devices 14 may assume the form of or include a movable display device (e.g., head-worn display devices) or a portable display device, such as an Electronic Flight Bag (EFB) or laptop computer, carried into the A/C cockpit by a pilot or other aircrew member. During operation of cockpit display system 10, controller 12 drives cockpit display devices 14 to generate one or more graphical displays thereon. Specifically, and as schematically indicated on the left side of FIG. 1, controller 12 may drive cockpit display devices 14 to generate: (i) an HNAV display 28 including HNAV DAEM symbology 30, and (ii) a VSD 32 including VSD DAEM symbology 34. HNAV display 28 and VSD 32 may be produced on a single display screen in, for example, a side-by-side or picture-in-picture format. Alternatively, HNAV display 28 and VSD 32 may be produced on separate display screens.

Controller 12 may comprise or be associated with any suitable number of individual microprocessors, flight control computers, navigational equipment, memories (including or in addition to memory 20), power supplies, storage devices, interface cards, and other standard components known in the relevant field. Controller 12 may include or cooperate with any number of software programs (e.g., avionics display programs) or instructions (e.g., as stored in memory 20) designed to carry out the various methods, process tasks, calculations, and control/display functions described more fully herein. Although illustrated as a separate block in FIG. 1, memory 20 may be partially or wholly integrated into controller 12 in embodiments. In one embodiment, controller 12 and memory 20 are produced as an Application Specific Integrated Circuit (ASIC), a System-in-Package (SiP), or a microelectronic module. Memory 20 may store data utilized to support the operation of cockpit display system 10. Furthermore, as noted above, memory 20 may store any number of databases 22, which may include navigational, weather, and/or terrain databases. One or more of databases 22 may be included in an Enhanced Ground Proximity Warning System (EGPWS) or a Runway Awareness and Advisory System (RAAS). More generally, controller 12 and the other components of cockpit display system 10 may be included or cooperate with any number and type of systems commonly deployed onboard aircraft including, for example, a Flight Management System (FMS), an Attitude Heading Reference System (AHRS), an Instrument Landing System (ILS), and an Inertial Reference System (IRS), to list but a few examples.

With continued reference to FIG. 1, ownship data sources 16 include multiple onboard sensors and other components suitable for monitoring data useful in performing the processes described herein. The particular types of data collected by ownship data sources 16 and provided to controller 12 will vary amongst different embodiments of cockpit display system 10. Generally, ownship data sources 16 will include a number of flight parameter sensors 36, which supply data to controller 12 describing various different operational conditions of the ownship A/C utilized in generating VSD 32 and HNAV display 28. Data provided by ownship data sources 16 can include, without limitation: airspeed data; groundspeed data; altitude data; attitude data including pitch data and roll data; yaw data; geographic position data, such as Global Positioning System (GPS) data; data relating to gross A/C weight; time/date information; heading information; data describing current and forecasted atmospheric conditions, such wind speed and direction measurements; flight path data; track data; radar altitude data; geometric altitude data; and data pertaining to fuel consumption, to list but a few examples. Finally, datalink subsystem 24 may assume any form enabling wireless bi-directional communication between the ownship aircraft and one or more external data sources, such as an ATC and/or neighboring A/C. Datalink subsystem 24 may be utilized to provide ATC data to the ownship aircraft and/or to send information from the ownship aircraft to ATC in compliance with known standards and specifications.

Several exemplary embodiments of HNAV display 28, HNAV DAEM symbology 30, VSD 32, and VSD DAEM symbology 34, as generated by cockpit display system 10 on cockpit display devices 14, will now be described in conjunction with FIGS. 2-13. For consistency, reference numerals "28," "30," "32," and "34" are carried-over from FIG. 1 to FIGS. 2-13 and utilized in the following description. This notwithstanding, it is emphasized that HNAV display 28, HNAV DAEM symbology 30, VSD 32, and VSD DAEM symbology 34 will inevitably vary in appearance across different implementations of cockpit display system 10. Moreover, cockpit display system 10 need not produce DAEM symbology on both HNAV display 28 and VSD 32 in all embodiments. Instead, in further embodiments, cockpit display system 10 may generate DAEM symbology similar or identical to that described below exclusively on HNAV display 28, on VSD 32, or on another type of cockpit display, such as a Primary Flight Display (PFD) or other three dimensional cockpit display.

Figure 2:
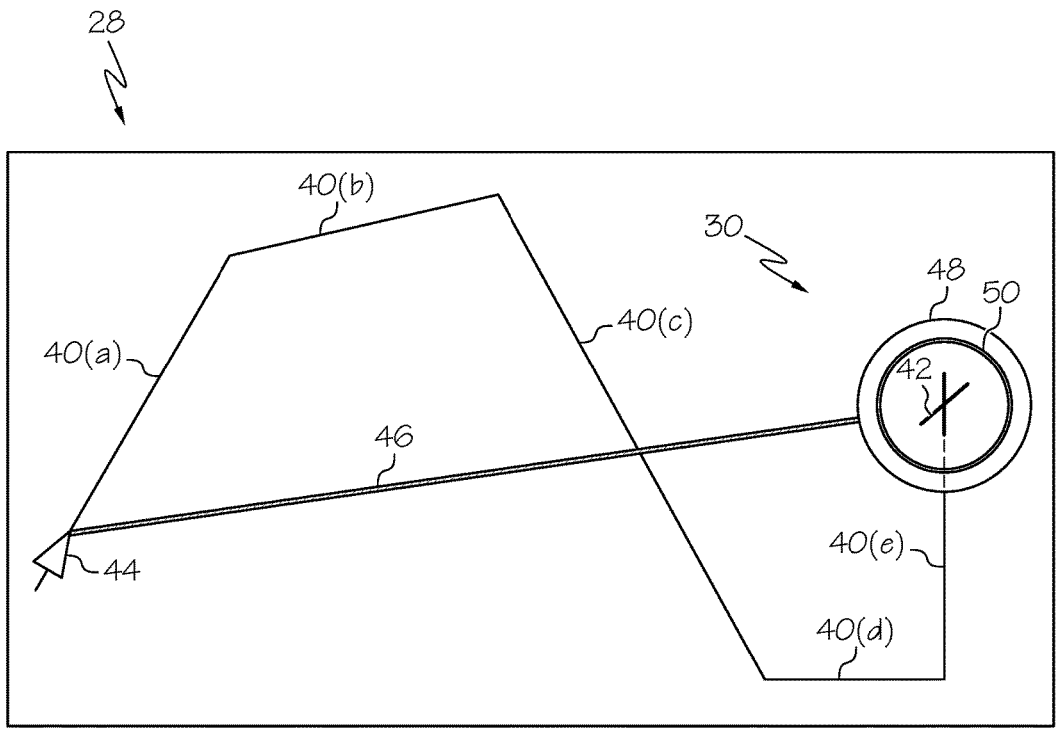
Figure 3:
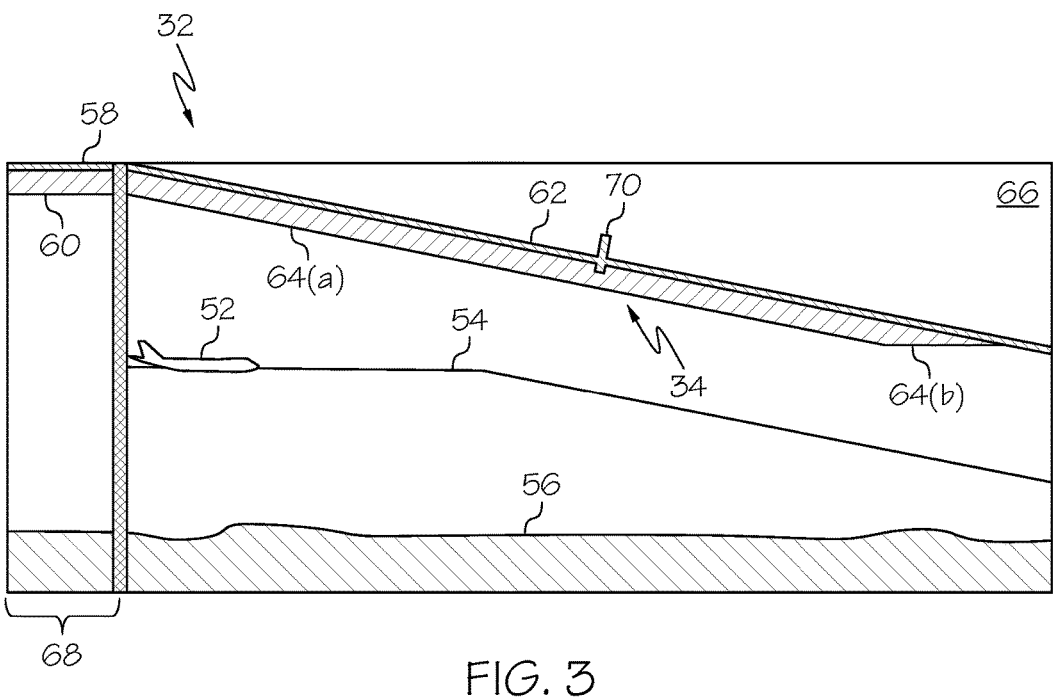

FIGS. 2 and 3 are screenshots of an exemplary HNAV display 28 and VSD 32, respectively, which may be generated by cockpit display system 10 (FIG. 1) in a first exemplary flight scenario. As previously noted, HNAV display 28 and VSD 32 are generated to include HNAV DAEM symbology 30 and VSD DAEM symbology 34, respectively. In this exemplary flight scenario, the ownship A/C has been assigned a multi-leg approach route by ATC or another air traffic authority, the approach route represented by graphic 40 in FIG. 2. Multi-leg approach route graphic 40 contains a number of connected line segments 40(*a*)-(*e*), which each represent a different leg of the approach route. The multi-leg approach route terminates at a destination runway located within an airport or other destination airfield. For illustrative clarity, and given the scale of HNAV display 28, the destination airfield is represented on HNAV display 28 as a simplified, X-shaped airfield icon 42. In further implementations, other symbology or more realistic depictions of the airfield may be generated on HNAV display 28. The current horizontal position (latitude and longitude) of the ownship A/C is represented by HNAV A/C icon 44. Thus, as shown in FIG. 2, the appearance of HNAV A/C icon 44 over leg segment 40(*a*) of multi-leg approach route graphic 40 indicates that the ownship A/C is presently traveling along the first leg of the multi-leg approach route.

In the example shown in FIG. 2, HNAV DAEM symbology 30 includes three primary graphical elements: (i) a Direct Approach (DA) path graphic 46, (ii) a configuration ring graphic 48, and (iii) a Glide Slope (G/S) intercept ring graphic 50. DA path graphic 46 provides a visual representation of a direct approach path terminating at configuration ring graphic 48, as seen from a top-down or planform perspective. In the illustrated example, DA path graphic 46 is generated as a line segment, which extends from the nose of HNAV A/C icon 44 to an intersection point with configuration ring graphic 48. The particular point at which DA path graphic 46 intersects configuration ring graphic 48 (and, thus, the particular point at which the DA path intersects the configuration ring) will vary based the current horizontal A/C position (as represented by HNAV A/C icon 44) relative to the position and radius of ring graphic 48 and the configuration ring represented thereby. The position of the configuration ring and ring graphic 48 may, in turn, vary based upon whether the destination runway is known to controller 12 of cockpit display system 10; e.g., whether a pilot or other aircrew member has loaded a runway into an FMS included within or operatively coupled to cockpit display system 10. If a destination runway is known to cockpit display system 10, controller 12 may generate the configuration ring and ring graphic 48 to be centered about a runway-specific touchdown point corresponding to the destination runway, such as the touchdown zone of the destination runway. If a destination runway is presently unknown to cockpit display system 10, controller 12 may center the configuration ring and ring graphic 48 on a default touchdown point, such as a central region of the destination airfield represented by airfield icon 42.

Graphics 46, 48, 50 may be continually displayed on HNAV display 28 or, perhaps, only selectively generated thereon. For example, DA path graphic 46 may be selectively generated on HNAV display 28 and automatically appear only after certain criteria are satisfied, such as assignment of a multi-leg approach route (as entered into cockpit display system 10 by a pilot or via automated entry of ATC-received data) or entry of the A/C into a certain proximity of the destination airfield. Additionally or alternatively, display of G/S intercept ring graphic 50 may be suppressed in instances in which the destination airfield does not support ILS approaches. In still further embodiments, DA path graphic 46, configuration ring graphic 48, and/or G/S intercept ring graphic 50 may only be displayed in response to pilot input received via pilot input interface 18 (FIG. 1). The radius of configuration ring graphic 48 can be fixed or, instead, may vary based upon one or more parameters. Generally, the radius of configuration ring graphic 48 is selected as a horizontal (ground) distance affording the aircrew with adequate opportunity to reconfigure the ownship A/C for landing, providing that the A/C is traveling at or near a target airspeed (the configuration airspeed) and at or near a target altitude (a configuration HAT). The radius of configuration ring graphic 48 may consequently vary based upon aircraft type and changing environmental conditions, such as temperature variations; variations in wind speed and direction; the presence of rain, sleet, snow, or fog; and other such conditions.

G/S intercept ring graphic 50 may be generated as a ring-shaped graphic, which is concentric with configuration ring graphic 48. Thus, as is configuration ring graphic 48, G/S intercept ring graphic 50 is also centered about the above-described touchdown reference point. The radius of G/S intercept ring graphic 50 may be determined by the horizontal (ground) distance at which the ownship A/C is anticipated to intercept the G/S beam during an ILS approach. In an embodiment, the horizontal distance to the G/S intercept point is calculated by cockpit display system 10 based upon an expected G/S beam angle and a set altitude at which G/S intercept desirably occurs. The set altitude may be a standardized value of, for example, 1500 feet (457.2 meters) HAT, as measured with respect to the touchdown zone of the destination runway (if known to cockpit display system 10) or with respect to the nearest runway surface if the destination runway is unknown to display system 10. The expected G/S beam angle may be runway specific and established by recalling a published G/S beam angle from onboard databases 22, entered into cockpit display system 10 or an FMS associated with display system 10 by the aircrew, wirelessly communicated to cockpit display system 10 via datalink subsystem 24, or otherwise provided to display system 10. Alternatively, if a runway-specific expected G/S beam angle cannot be established, cockpit display system 10 may instead utilize a default value, such as a 3 degree(°) G/S beam angle, in determining the radius of G/S intercept ring graphic 50 and the below-described configuration point.

Discussing FIG. 3 in greater detail, there is shown a VSD A/C icon 52, a computed vertical descent profile 54, and a terrain graphic 56. Generally, the vertical distance between VSD A/C icon 52 and terrain graphic 56 is scaled to denote the current Above Ground Level (AGL) altitude of the ownship A/C with respect to the surrounding terrain. Comparatively, computed vertical descent profile 54 represents a vertical path ideally followed by the ownship A/C during descent. Computed vertical descent profile 54 may be calculated by an FMS utilizing any number of parameters including, for example, wind speeds, glide path angles, obstacle avoidance data, aircraft flight characteristics, and the like. Computed vertical descent profile 54 corresponds to multi-leg approach route graphic 40 shown on HNAV display 28 (FIG. 2), but does not visually convey the variations in the horizontal A/C position (latitude and longitude) as the ownship A/C progresses along the multi-leg approach route represented by graphic 40 in FIG. 2. A pilot may thus be required to glance between HNAV display 28 and VSD 32 as the ownship A/C is directed along the multi-leg approach route.

In addition to the graphics described above, VSD 32 contains multiple graphical elements collectively forming VSD DAEM symbology 34. Of particular note, VSD DAEM symbology 34 includes a number of DAEE graphics 58, 60, 62, 64. DAEE graphics 58, 60, 62, 64 include, in turn, one or more instantaneous DAEM markers or indicators 58, 60. In the illustrated example, DAEM indicator 58, 60 is generated as a band or bar-shaped graphic and is consequently referred to hereafter as "DAEM bar 58, 60." In other embodiments, the instantaneous DAEM indicator or indicators generated on VSD 32 may have a different appearance. DAEM bar 58, 60 may be shaded, opaque, filled with a pattern, or generated to have any other appropriate fill, opacity, color, or the like. DAEM bar 58, 60 is defined by or bounded by an upper bar boundary 58 and a lower bar boundary 60. Controller 12 generates VSD 32 such that vertical positioning of bar boundaries 58, 60 varies over time. Stated differently, controller 12 generates VSD 32 such that bar boundaries 58, 60 move vertically which respect to other graphical elements produced on VSD 32, including VSD A/C icon 52, and potentially with respect to each other. The vertical positioning of bar boundaries 58, 60, and therefore the vertical position and vertical height of DAEM bar 58, 60, may be adjusted to reflect changes in the instantaneous energy estimates required for the ownship A/C to perform a managed energy direct approach utilizing different energy dissipation schemes. Additional description in this regard is provided below.

DAEE graphics 58, 60, 62, 64 are further generated to include a projected DAEM vertical corridor or profile range 62, 64. Projected DAEM profile range 62, 64 is bound by an upper DAEM vertical profile 62 and a lower DAEM vertical profile 64. Projected DAEM profile range 62, 64 is located in a main portion 66 of VSD 32, which further contains VSD A/C icon 52, computed vertical descent profile 54, and a majority of terrain graphic 56. In contrast, instantaneous DAEM bar 58, 60 appears in a leftward-extended portion 68 of VSD 32 (referred to herein as "VSD sidebar 68" or "VSD elevator 68"). VSD sidebar 68 is located immediately aft of VSD A/C icon 52 and may be generated to contain a lesser, extended portion of terrain graphic 56. In certain embodiments, VSD DAEM symbology 34 may also include additional graphics located in either main portion 66 of VSD 32 or in VSD sidebar 68. In this regard, VSD DAEM symbology 34 may include cues indicating the timing and sequence of the deployment of auxiliary drag devices; the term "auxiliary drag devices" excluding flaps and slats and, in certain instances, including landing gear. For example, as shown in FIG. 3 and discussed more fully below, a speed brake or airbrake deployment cue 70 may further be produced on VSD 32 to visually denote the anticipated timing of airbrake deployment in the context of upper DAEM vertical profile 62.

VSD sidebar 68, upper DAEM vertical profile 62, and lower DAEM vertical profile 64 provide visual emphasis regarding the current energy content of the ownship A/C as compared to the estimated energy required to carry-out a managed energy direct approach. While this is useful, VSD 32 can be generated to exclude these graphics in further embodiments. Similarly, in other implementations, VSD 32 may be generated to generally appear as shown in FIG. 3, while excluding projected DAEM profile range 62, 64 and any drag device deployment markers, such as airbrake deployment cue 70. In such cases, instantaneous DAEM bar 58, 60 may be relied upon to convey the desired energy management or awareness information to the pilot and other aircrew members. In still further embodiments, VSD 32 may be generated to lack DAEM symbology entirely, in which case DAEM symbology may be produced exclusively on another display, such as HNAV display 28. In this latter case, conformance (or non-conformance) between the current energy content of the ownship A/C relative to the estimated energy required to execute a managed energy direct approach may be visually conveyed via HNAV display 28 by, for example, color coding or otherwise varying the appearance of DA path graphic 46 and/or configuration ring graphic 48 in the manner described below.

In an embodiment, the vertical position of upper bar boundary 58 is determined by the disparity, if any, between the current energy content of the ownship A/C and the maximum energy estimate allowing the ownship A/C to perform a managed energy direct approach at the present juncture in time when flying the direct approach path represented by DA path graphic 46 (FIG. 2). Controller 12 of cockpit display system 10 (FIG. 1) can determine the current energy content of the ownship A/C based upon any number of parameters including, for example, the current airspeed of the ownship A/C, the current AGL or HAT of the ownship A/C, and the current weight of the ownship A/C. Controller 12 (FIG. 1) can further determine the estimated maximum energy state of the ownship A/C permitting a managed energy direct approach based upon those criteria affecting drag. In one non-limiting example, controller 12 (FIG. 1) calculates the estimated maximum energy allowing a managed energy direct approach based, at least in part, upon a constant descent angle to arrive at configuration ring graphic 48 (FIG. 2) below a predetermined configuration airspeed. In one computational approach, this estimated value is computed to enable the ownship A/C to slow to an airspeed less than the configuration airspeed before arriving at the Top of Descent (TOD) of the final approach. An enhanced energy dissipation scheme may be considering when calculating upper bar boundary 58, which may include the deployment of auxiliary drag devices including airbrakes and, perhaps, contemplating early landing gear deployment. The anticipated timing and sequence of such auxiliary drag device deployment may be visually indicated by markers produced on or adjacent upper bar boundary 58; hence, the appearance of airbrake deployment cue 70 (FIG. 3) indicating the projected deployment of the airbrakes along upper DAEM vertical profile 62. In certain instances, drag aggressive aircraft positioning may also be considered in this calculation, such as the drag coefficient of the ownship A/C if piloted to assume a high drag posture (flare-out) during some portion of the descent.

Lower bar boundary 60 of instantaneous DAEM bar 58, 60 is located below and separated from upper bar boundary 58 in a vertical direction. The vertical offset of lower bar boundary 60 relative to upper bar boundary 58 (and, thus, the vertical thickness or height of instantaneous DAEM bar 58, 60) may be determined by the disparity between the current energy content of the ownship A/C as compared to the estimated minimum energy required to fly a managed energy direct approach utilizing a standardized or non-aggressive energy dissipation scheme; e.g., without the usage of auxiliary drag devices, such as airbrakes and/or landing gear. Stated differently, controller 12 of cockpit display system 10 (FIG. 1) may calculate the estimated minimum energy threshold to fly a managed energy direct approach by determining the earliest point at which the ownship A/C can execute an idle descent to arrive at configuration ring graphic 48 (FIG. 2) below configuration airspeed without the usage of airbrakes or other auxiliary drag devices.

Upper DAEM vertical profile 62 and lower DAEM vertical profile 64 of projected DAEM profile range 62, 64 may be calculated in the essentially same manner as upper and lower bar boundaries 58 and 60 of instantaneous DAEM bar 58, 60, respectively, but projected forward in time to encompass the distance frame presented via VSD 32. DAEM vertical profiles 62, 64 may thus generally convey the rate at which the ownship A/C energy content will dissipate during the projected direct approach descent in accordance with an enhanced energy dissipation scheme (as conveyed by profile 62) and a standard energy dissipation scheme (as conveyed by profile 64). DAEM vertical profiles 62, 64 may only be a generalized approximation of such projected dissipation during the projected direct approach descent; e.g., the reduction in airspeed and, therefore, A/C energy content resulting from deployment of the auxiliary drag devices (e.g., airbrake as indicated by airbrake deployment cue 70) may or may not be reflected in upper DAEM vertical profile 62 to maintain a desired level of simplicity to VSD 32. In arriving at this projection, controller 12 of cockpit display system 10 may consider any number of factors including, for example, current A/C parameters, present meteorological conditions, and forecasted weather conditions, such as near future wind conditions likely to be encountered by the A/C when approaching the runway. In this regard, historical weather conditions may be recalled from onboard database 22 and/or additional weather data may be received from an external source via datalink subsystem 24. Lower DAEM vertical profile 64 may be projected into the near future as is upper DAEM vertical profile 62, although profile 64 may include multiple boundary segments, such constant descent angle segment 64(*a*) and level-off segment 64(*b*), as generally shown in FIG. 3.

During operation of cockpit display system 10, controller 12 (FIG. 1) repeatedly calculates (e.g., in real time) the proper vertical positioning of DAEE graphics 58, 60, 62, 64 on VSD 32 and updates or refreshes VSD 32 accordingly. DAEE graphics 58, 60, 62, 64 will consequently appear to move vertically with respect to VSD A/C icon 52, computed vertical descent profile 54, and terrain graphic 56 as the ownship A/C progresses along the multi-leg approach route represented by multi-leg approach route graphic 40 (FIG. 2). When instantaneous DAEM bar 58, 60 and the leftmost portion of projected DAEM profile range 62, 64 are located vertically above VSD A/C icon 52, this indicates that the current energy content of the ownship A/C is presently insufficient to carry-out a managed energy direct approach corresponding to DA path graphic 46 (FIG. 2). Conversely, when instantaneous DAEM bar 58, 60 and the leftmost portion of projected DAEM profile range 62, 64 are located vertically below VSD A/C icon 52, this indicates that the current energy content of the ownship A/C is too great to carry-out a managed energy direct approach at the present juncture in time. Finally, when VSD A/C icon 52 vertically overlaps with instantaneous DAEM bar 58, 60 and the leftmost portion of projected DAEM profile range 62, 64, this indicates that the current energy content of the ownship A/C falls within an acceptable range to perform a managed energy direct approach. Additional examples in this regard will now be discussed further in conjunction with FIGS. 2-13.

In the flight scenario of FIGS. 2-3, and as may be appreciated by referencing the location of HNAV A/C icon 44 in FIG. 2, the ownship A/C is currently traveling along the first leg of the multi-leg approach route represented by line segment 40(*a*). Here, the waypoints of the multi-leg approach route have been loaded into cockpit display system 10 specifying the destination airfield; however, the destination runway has not been entered and is currently unknown to controller 12 of cockpit display system 10. Accordingly, DA path graphic 46 is drawn as a straight line extending from the nose of HNAV A/C icon 44 toward the default touchdown reference point, namely, the center of the destination airfield represented by airfield icon 42 (FIG. 2). In the screenshot of FIG. 3, the positioning of VSD DAEM symbology 34 above VSD A/C icon 52 by a relatively large vertical offset quickly conveys that the current energy content of the ownship A/C is considerably less than the minimum energy threshold required to fly a managed energy direct approach corresponding to DA path graphic 46 (FIG. 2). Thus, should the ownship A/C receive clearance to fly a direct approach to the runway, the pilot (or other aircrew member) need only glance at VSD 32 to determine that the A/C is likely to arrive at the configuration point (the intersection between the direct approach path and the configuration ring) in an under-energy state and additional thrust may be required to perform the direct approach. This prediction may also be indicated on HNAV display 28 by, for example, visually coding DA approach path graphic 46 and/or configuration ring graphic 48 on HNAV display 28 in some manner; e.g., in an embodiment, DA path graphic 46 may be color coded to a pre-established caution or warning color, such as amber or red, to indicate that a relatively large disparity exists between the present energy content of the ownship A/C and the estimated energy requirements of the direct approach.

Figure 4:
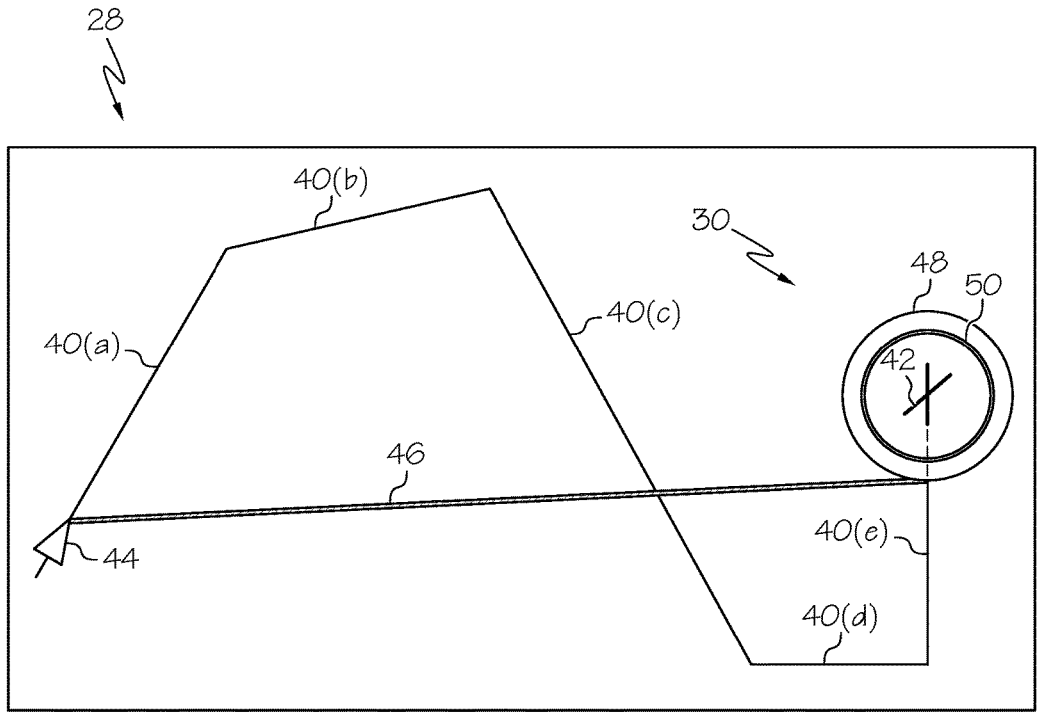
FIGS. 4 and 5 are screenshots of the HNAV display and VSD, respectively, as shown in a second exemplary flight scenario in which the A/C is projected to arrive in an under-energy state if proceeding directly to a runway-specific configuration point over the airfield under engine idle conditions.
Figure 5:
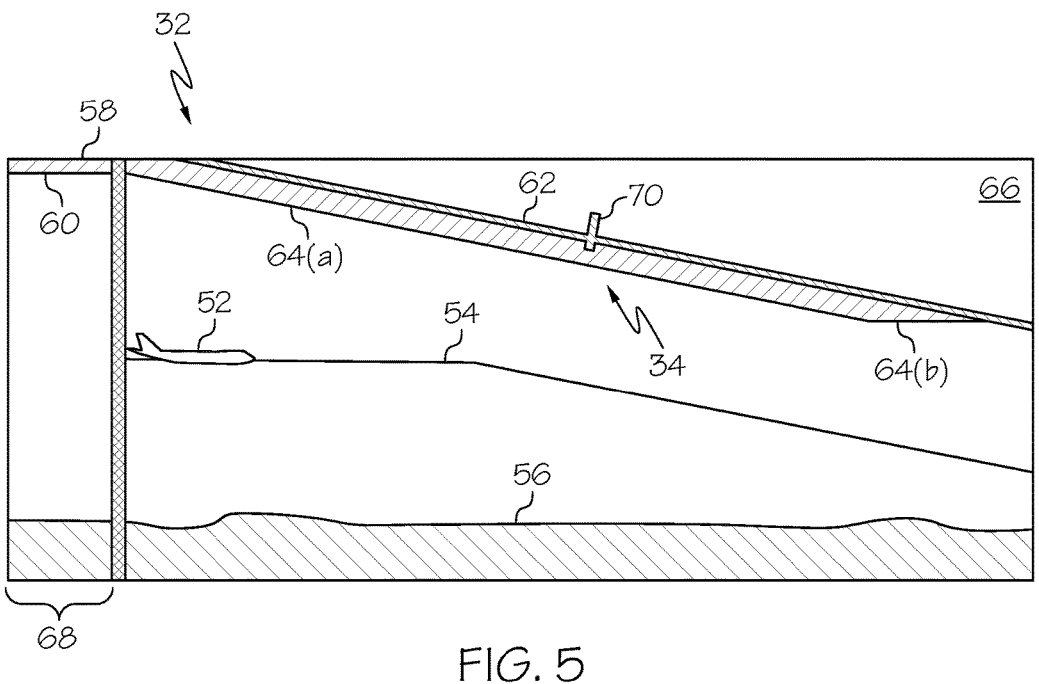

As previously observed, the multi-leg approach route and destination airport is known, but the destination runway is not yet known to controller 12 of cockpit display system 10 (FIG. 1) in the flight scenario of FIGS. 2-3. Accordingly, in the above-described example of FIGS. 2-3, the positioning of configuration ring graphic 48 and the orientation of the direct approach path (as represented by DA path graphic 46) are determined utilizing a default touchdown reference point, such as the center of the airfield represented by airfield icon 42. This may be contrasted against the flight scenario shown in FIGS. 4-5, which is essentially identical to the scenario shown in FIGS. 2-3, with the exception that the destination runway has now become known to controller 12 of cockpit display system 10 by, for example, pilot entry of the destination runway into an FMS included within or associated with system 10. Accordingly, and as can be seen in FIG. 4, DA path graphic 46 has been adjusted to now terminate at the point along configuration ring graphic 48 nearest the touchdown zone or threshold of the newly-specified destination runway. Additionally, as shown in FIG. 5, the relative vertical positioning of VSD DAEM symbology 34 has likewise been adjusted to reflect this change in the direct approach path and the corresponding changes in the energy estimate values conveyed by DAEE graphics 58, 60, 62, 64.

Figure 6:
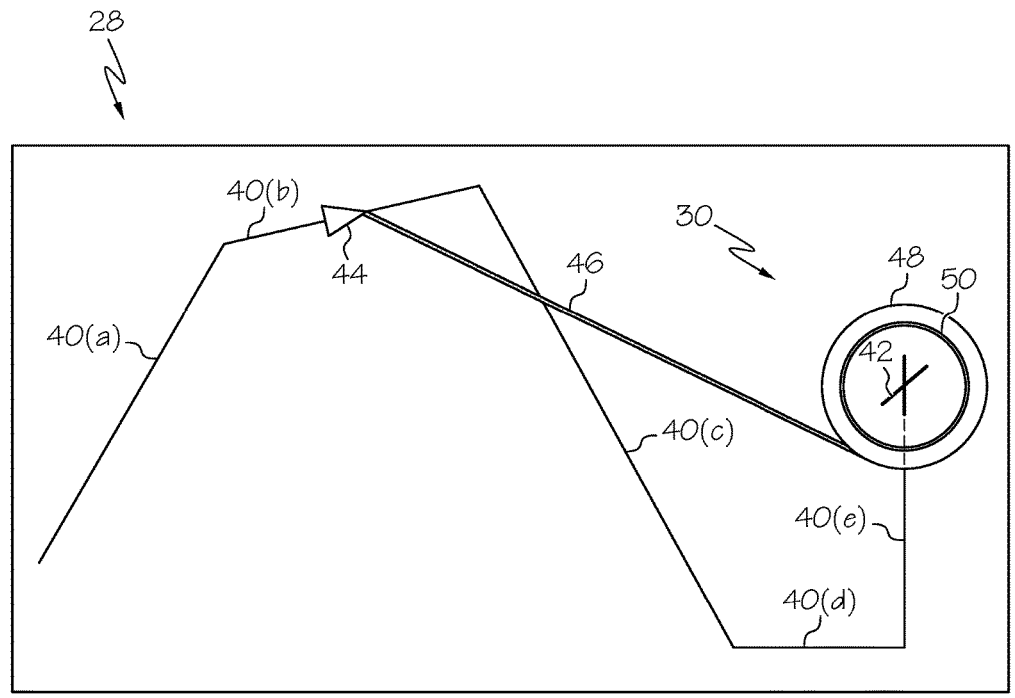
FIGS. 6 and 7 are screenshots of the HNAV display and VSD, respectively, as shown in a third exemplary flight scenario in which the A/C is projected to arrive in an acceptable energy state if proceeding directly to the runway-specific configuration point in accordance with a standard energy dissipation scheme.
Figure 7:
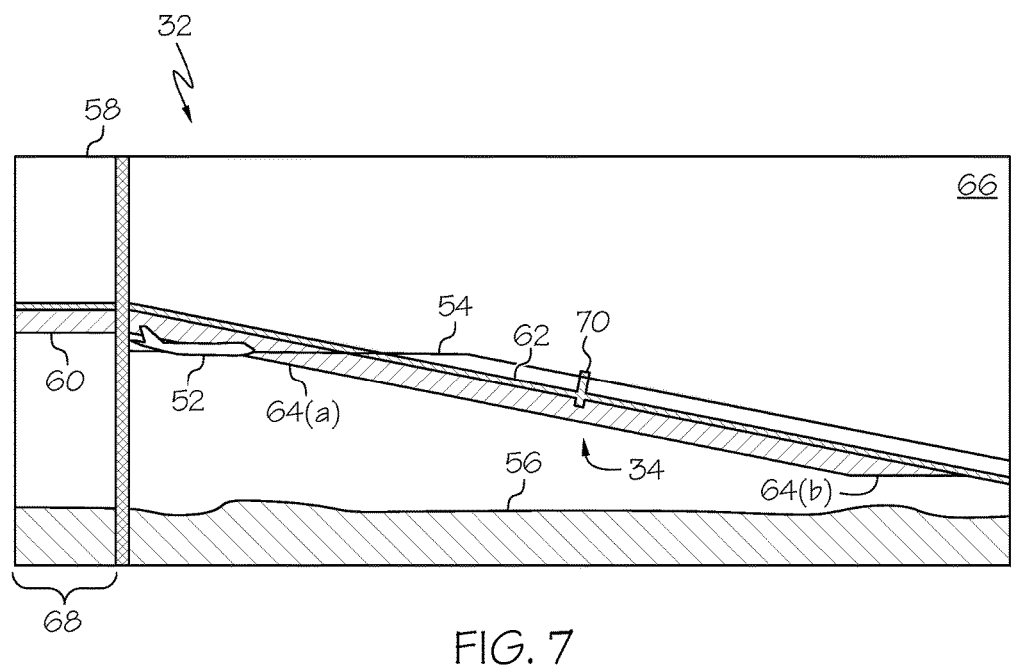

Turning to the flight scenario shown in FIGS. 6-7, the ownship A/C has now progressed further along the assigned multi-leg approach route. As indicated by HNAV display 28 shown in FIG. 6, the current A/C position is located along the second leg of the approach route represented by line segment 40(b). The DA approach path represented by DA path graphic 46 (FIG. 6) is now shortened in length. Furthermore, as indicated in FIG. 7, VSD DAEE graphics 58, 60, 62, 64 have vertically descended on VSD 32 such that a region of lower DAEM vertical profile 64 now overlaps with VSD A/C icon 52. An intuitive visual cue is thus provided that the ownship A/C can presently proceed directly to the configuration point of the destination runway (corresponding to the intersection between DA path graphic 46 and configuration ring graphic 48) and arrive below the desired configuration airspeed; e.g., at idle and without the usage of auxiliary drag deployment devices, such as airbrakes. This additional energy awareness afforded by DAEM symbology 30, 34 may also help increase pilot confidence in accepting and executing a direct approach if and when such an approach is cleared by the ATC. If so desired, DA approach path graphic 46 appearing on HNAV display 28 (FIG. 6) may be visually coded to indicate that the ownship A/C is presently capable of flying a managed energy direct approach at the present juncture in time; e.g., DA approach path graphic 46 may be generated to have an enlarged form, an animation (e.g., flashing) may be applied, and/or graphic 46 may be color coded to a pre-established informational color, such as white or green.

Figure 8:
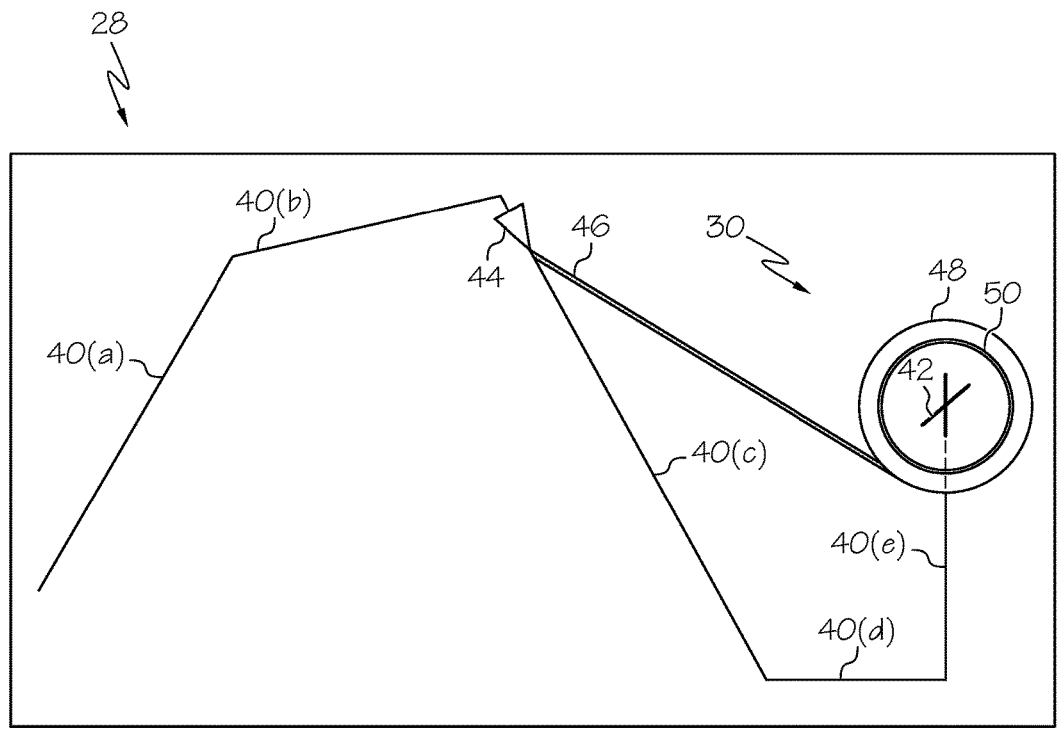
FIGS. 8 and 9 are screenshots of the HNAV display and VSD, respectively, as shown in a fourth exemplary flight scenario in which the A/C is projected to arrive in an acceptable energy state if proceeding directly to the runway-specific configuration point in accordance with an enhanced energy dissipation scheme.
Figure 9:
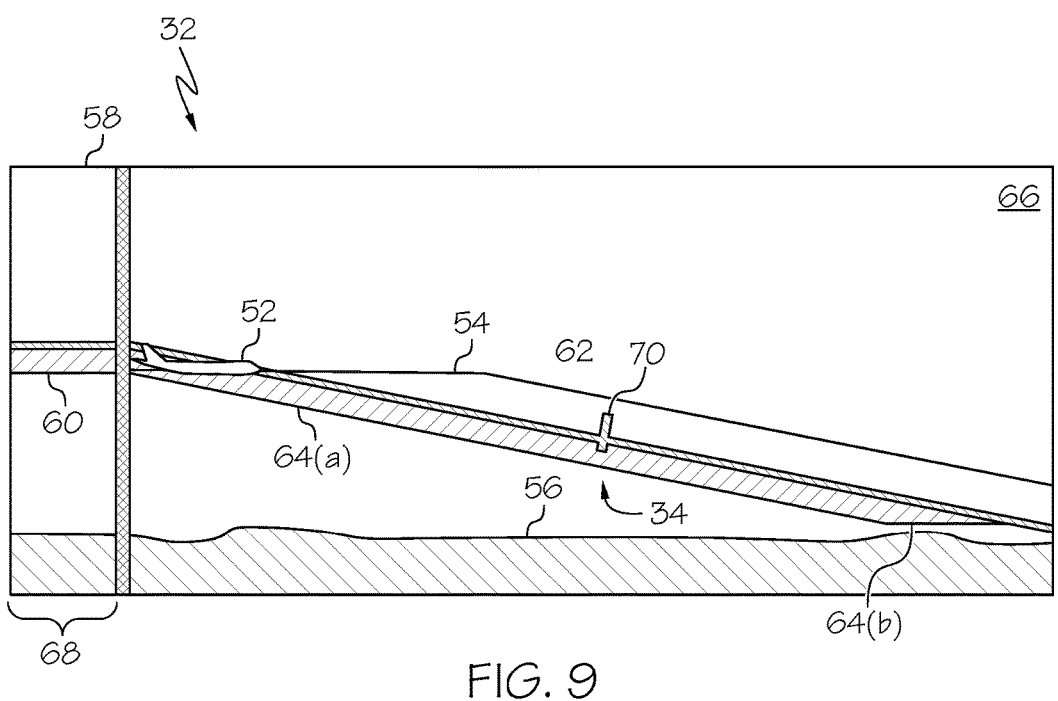

In the successive flight scenario illustrated in FIGS. 8-9, the ownship A/C has entered the third leg of the assigned multi-leg approach route. Accordingly, HNAV display 28 (FIG. 8) now indicates that the current A/C position (as represented by HNAV A/C icon 44) is located on or adjacent an initial portion of the third approach leg, as represented by line segment 40(c) in FIG. 6. DA path graphic 46 has decreased further in length and cannot be drawn to the same point as in FIG. 6 without transecting or crossing-over configuration ring graphic 48. Consequently, DA path graphic 46 has been drawn to terminate at the closest tangent point along the perimeter of configuration ring graphic 48. As indicated in FIG. 9, upper DAEM vertical profile 62 now overlaps with the nose portion of VSD A/C icon 52. This indicates that the ownship A/C can still proceed directly to the configuration point of the destination runway and arrive below the desired configuration airspeed, providing that an aggressive or enhanced energy dissipation scheme is employed; e.g., an energy dissipation scheme involving the timed deployment of one or more auxiliary drag devices, such as airbrakes. Again, as was the case with the flight scenario of FIGS. 6-7, DA approach path graphic 46 may be color coded to an informational color (e.g., green or white) or otherwise visually coded to indicate that acceptance of DA clearance may be advisable (subject to other considerations that may not be conveyed by the DAEM symbology, such as intervening obstacles).

Advancing next to the flight scenario shown in FIGS. 10-11, the ownship A/C has progressed further and is midway along the third leg of the assigned multi-leg approach route. This can be appreciated by referring to the positioning of HNAV A/C icon 44 with respect to line segment 40(c) on HNAV display 28 (FIG. 10). The ownship A/C is relatively close to the configuration point along configuration ring graphic 48 at this juncture. Execution of a direct approach is correspondingly projected to deliver the A/C at the configuration point in an over-energy state; that is, at an excessive airspeed and/or an excessive HAT. This is visually conveyed by the screenshot of VSD 32 shown in FIG. 11 in which VSD DAEM symbology 34 is now located vertically beneath VSD A/C icon 52. A pilot thus needs only glance at VSD 32 to determine that acceptance and execution of a direct approach at the present juncture will likely result in an undesirable outcome associated with an over-energy state of the A/C, such as the need to abort the resulting landing attempt or a potential runway excursion should touchdown occur.

Turning finally to the flight scenario of FIGS. 12-13, a pilot can potentially deviate the ownship A/C from the multi-leg approach route (with proper clearance) to bring the A/C to a point at which the direct approach can be executed within acceptable energy management parameters. HNAV DAEM symbology 30 and VSD DAEM symbology 34 may enhance pilot awareness of the practicality of departing from the multi-leg approach route based, at least in part, by pilot reference to the vertical offset (and the general movement trend) of DAEE graphics 58, 60, 62, 64 relative to VSD A/C icon 52. Thus, as may be appreciated by comparing FIGS. 11 and 13, a pilot can quickly determine from VSD 32 in FIG. 11 that a relatively minor deviation from the multi-leg flight path, as represented by graphic 40 in FIGS. 10 and 12, may bring the current A/C energy state into conformance with the estimate energy requirements needed to successfully carry-out a managed energy direct approach to the configuration point. Alternatively, a pilot afforded the benefit of HNAV display 28 and VSD 32 shown in FIGS. 10-11 may simply decline the ATC-cleared direct approach and fly the remainder of the multi-leg approach route corresponding to graphic 40. Regardless of which option is chosen, the pilot's decision-making is enhanced by the provision of HNAV DAEM symbology 30 on HNAV display 28 and VSD DAEM symbology 34 on VSD 32.

The foregoing has thus provided exemplary embodiments of a cockpit display system and method for generating DAEM symbology on cockpit displays, which aid pilot decision-making when evaluating and executing direct approaches. In the above-described exemplary embodiment, the DAEM symbology is presented on a VSD in conjunction with other graphics including, for example, an ownship A/C icon. The DAEM symbology may include one or more instantaneous DAEM indicators, such a bar or band graphic, which visually denotes a target energy content (whether expressed as a single value or a range) required to bring the ownship A/C to a target configuration point located over an airfield at a configuration airspeed. Additionally or alternatively, the DAEM symbology may include one or more projected DAEM vertical profiles, which graphically represent the target energy content of the ownship A/C extended in the near future in accordance with one or more anticipated energy dissipation schemes. By comparing relative vertical position of the ownship A/C icon to the position of the DAEM symbology, a pilot can quickly ascertain whether the current A/C energy content adequately conforms with the target energy content to increase the likelihood that the ownship A/C will arrive at the configuration point in an appropriate energy state upon execution of a direct approach. Additional DAEM symbology may also be generated on one or more additional cockpit displays, such as an HNAV display. Such knowledge may be particularly beneficial when the aircraft is flown along a multi-leg approach route, ATC clearance is granted to proceed directly to the configuration point, and the pilot is tasked with considering and possibly executing the direct approach.

In an embodiment, the cockpit display system includes a cockpit display device on which a VSD is generated. A controller is operably coupled to the cockpit display device and configured to: (i) identify a Direct Approach (DA) path to a configuration point located over an airfield approached by the aircraft for landing; (ii) determine a first DA energy estimate for the aircraft to fly the DA path and arrive at the configuration point below a configuration airspeed; and (iii) generate symbology on the VSD indicative of the first DA energy estimate. In certain embodiment wherein the first DA energy estimate is a maximum DA energy estimate, the controller may calculate the maximum DA energy estimate (e.g., as represented by graphic 58 or 62 in FIGS. 3, 5, 7, 9, 11, and 13) based upon a projected vertical descent profile during which an auxiliary drag device, such as airbrakes, is deployed. In such embodiments, the controller may generate generating the VSD to include symbology (e.g., deployment cue 70 in FIGS. 3, 5, 7, 9, 11, and 13) indicative of an anticipated timing of the deployment of the auxiliary drag device during the projected vertical descent profile. Additionally or alternatively, the controller may be further configured to: (i) calculate a minimum DA energy estimate for the aircraft to fly the DA path under engine idle conditions and arrive at the configuration point with an airspeed less than the configuration airspeed without deployment of the auxiliary drag device; and (ii) generate symbology on the first cockpit display indicative of the minimum DA energy estimate. In such embodiments, the controller may further generate the VSD to include a substantially bar-shaped graphic (e.g., graphic 58, 60) having an upper edge representative of the maximum DA energy estimate and a lower edge representative of the minimum DA energy estimate.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A cockpit display system onboard an aircraft, the cockpit display system comprising:
   a cockpit display device on which a first cockpit display is generated; and
   a controller operably coupled to the cockpit display device and configured to:
      identify a direct approach (DA) path to a configuration point located over a destination airfield;
      calculate a first DA energy estimate for the aircraft to fly the DA path under engine idle conditions and arrive at the configuration point with an airspeed less than a configuration airspeed; and
      generate symbology on the first cockpit display indicative of the first DA energy estimate,
   wherein the first cockpit display comprises a Vertical Situation Display (VSD) including an aircraft icon, and wherein the controller is configured to adjust a position of the symbology on the VSD relative to the aircraft icon as the first DA energy estimate varies with respect to a current energy content of the aircraft, and the controller is configured to adjust a vertical position of the symbology on the VSD relative to the aircraft icon such that the symbology is: (i) located vertically above the aircraft icon when the current energy content of the aircraft is less than the first DA energy estimate, and (ii) located vertically below the aircraft icon when the energy content of the aircraft is greater than the first DA energy estimate.

2. The cockpit display system of claim 1 wherein the controller is configured to repeatedly perform the steps of identifying, calculating, and generating, while the aircraft flies a multi-leg approach route terminating at the destination airfield.

3. The cockpit display system of claim 2 wherein the first cockpit display comprises a horizontal navigation display, and wherein the controller is configured to generate the horizontal navigation display to include:
   a multi-leg approach route graphic representative of the multi-leg approach route; and
   a DA path graphic representative of the DA path.

4. The cockpit display system of claim 3 wherein the controller is configured to vary the appearance of the DA path graphic, as generated on the horizontal navigation display, based upon a disparity between the first DA energy estimate and a current energy content of the aircraft.

5. The cockpit display system of claim 1 wherein the first cockpit display comprises a Vertical Situation Display (VSD), wherein the controller is further configured to generate a horizontal navigation display concurrently with the VSD, and wherein the controller is configured to generate the horizontal navigation display to include a DA path graphic representative of the DA path.

6. The cockpit display system of claim 1 wherein the controller is configured to determine the configuration point based, at least in part, on an intersection point between the DA path and a configuration ring centered about a touchdown reference point.

7. The cockpit display system of claim 6 wherein the controller is configured to locate the touchdown reference point at:
   a default location corresponding to the destination airfield when a destination runway is unknown to the cockpit display system; and
   at a touchdown zone of the destination runway when the destination runway is known to the cockpit display system.

8. The cockpit display system of claim 7 wherein the first cockpit display comprises a horizontal navigation display, the controller configured to generate the horizontal navigation display to include:
   a configuration ring graphic representative of the configuration ring; and
   a glide slope intercept ring graphic substantially concentric with the configuration ring graphic and the touchdown reference point.

9. The cockpit display system of claim 1 wherein the controller is configured to generate the symbology to comprise at least one marker having a position representative of an instantaneous energy estimate for the aircraft to fly the DA path under engine idle conditions and arrive at the configuration point with an airspeed less than the configuration airspeed.

10. The cockpit display system of claim 1 wherein the controller is configured to generate the symbology to comprise a first vertical profile graphic visually denoting a projected rate at which an energy content of the aircraft will dissipate when flying the DA path under a first energy dissipation scheme.

11. A cockpit display system onboard an aircraft, the cockpit display system comprising:
   a cockpit display device on which a first cockpit display is generated; and
   a controller operably coupled to the cockpit display device and configured to:
      identify a direct approach (DA) path to a configuration point located over a destination airfield;
      calculate a first DA energy estimate for the aircraft to fly the DA path under engine idle conditions and arrive at the configuration point with an airspeed less than a configuration airspeed; and
   generate symbology on the first cockpit display indicative of the first DA energy estimate,
   wherein the first DA energy estimate comprises a maximum DA energy estimate, and wherein the controller is configured to calculate the maximum DA energy estimate based upon a projected vertical descent profile of the aircraft during which an auxiliary drag device is deployed.

12. The cockpit display system of claim 11 wherein the controller is configured to generate the cockpit display to include a deployment cue indicating an anticipated timing of the deployment of the auxiliary drag device as the aircraft flies the projected vertical descent profile.

13. The cockpit display system of claim 11 wherein the controller is further configured to:
   calculate a minimum DA energy estimate for the aircraft to fly the DA path under engine idle conditions and arrive at the configuration point with an airspeed less than the configuration airspeed without deployment of the auxiliary drag device; and
   generate symbology on the first cockpit display indicative of the minimum DA energy estimate.

14. The cockpit display system of claim 13 wherein the controller is configured to generate the symbology to comprise a substantially bar-shaped graphic having an upper edge representative of the maximum DA energy estimate and a lower edge representative of the minimum DA energy estimate.

15. A method carried-out by a cockpit display system onboard an aircraft, the method comprising:
   identifying a direct approach (DA) path to a configuration point located over a destination airfield;
   calculating a first DA energy estimate for the aircraft to fly the DA path under engine idle conditions and arrive at the configuration point with an airspeed less than a configuration airspeed, wherein the first DA energy estimate comprises a maximum DA energy estimate, and the maximum DA energy estimate is based upon a projected vertical descent profile of the aircraft during which an auxiliary drag device is deployed; and
   generating symbology on a first cockpit display indicative of the first DA energy estimate.

16. The method of claim 15 wherein the first cockpit display comprises a Vertical Situation Display (VSD) including an aircraft icon, and wherein the method further comprising varying a vertical position of the symbology on the VSD relative to the aircraft icon as the first DA energy estimate varies with respect to a current energy content of the aircraft.

* * * * *